United States Patent
Eid et al.

(10) Patent No.: US 10,311,514 B2
(45) Date of Patent: Jun. 4, 2019

(54) FINANCIAL MESSAGING PLATFORM

(71) Applicants: Gilbert Eid, Kahhaleh (LB); Mark Haddad, Kesrouan (LB)

(72) Inventors: Gilbert Eid, Kahhaleh (LB); Mark Haddad, Kesrouan (LB)

(*) Notice: Subject to any disclaimer, the term of this patent is extended or adjusted under 35 U.S.C. 154(b) by 381 days.

(21) Appl. No.: 14/294,435

(22) Filed: Jun. 3, 2014

(65) Prior Publication Data

US 2014/0279336 A1 Sep. 18, 2014

Related U.S. Application Data

(60) Provisional application No. 61/840,259, filed on Jun. 27, 2013, provisional application No. 61/830,932, filed on Jun. 4, 2013, provisional application No. 61/934,695, filed on Jan. 31, 2014.

(51) Int. Cl.
| | |
|---|---|
| *G06Q 10/00* | (2012.01) |
| *G06Q 40/04* | (2012.01) |
| *G06Q 10/10* | (2012.01) |

(52) U.S. Cl.
CPC ........... *G06Q 40/04* (2013.01); *G06Q 10/107* (2013.01)

(58) Field of Classification Search
CPC ........................................ G06Q 40/04
USPC ...................................... 705/35–45
See application file for complete search history.

(56) References Cited

U.S. PATENT DOCUMENTS

| | | | |
|---|---|---|---|
| 6,405,318 B1* | 6/2002 | Rowland | G06F 21/552 726/22 |
| 7,203,658 B1* | 4/2007 | Gidwani | G06Q 30/06 705/26.81 |
| 2004/0078596 A1* | 4/2004 | Kent, Jr. | G06Q 10/107 713/160 |
| 2006/0026091 A1* | 2/2006 | Keen, Jr. | G06Q 40/04 705/37 |
| 2009/0192784 A1* | 7/2009 | Cole | G06F 17/2725 704/9 |
| 2012/0072368 A1* | 3/2012 | Mast | G06Q 40/06 705/36 R |

* cited by examiner

*Primary Examiner* — Chia-Yi Liu
(74) *Attorney, Agent, or Firm* — Georgiy L. Khayet

(57) ABSTRACT

A financial messaging platform enables a plurality of users to communicate with each other in real-time. The platform can flag and/or isolate user communications, which contain specific financial product related information related to a trade, order, or market. The platform presents these communications in a uniform manner such that users can easily differentiate them in chat rooms. Once a user communication is flagged or tagged, it is insistently transferred to affiliated information pools in the form of isolated messages. Information pools are virtual message aggregators associated with particular users, which consolidate isolated messages based on their characteristics, origin, and predetermined rules. Within an information pool, the messages can also be parsed into sortable categories and be presented into a manner suitable for analyzing. The platform can also include a compliance interface enabling particular compliance officers to oversee selected conversations between users and forbid suspect or inappropriate communications.

29 Claims, 9 Drawing Sheets

FINANCIAL MESSAGING PLATFORM

CROSS-REFERENCE TO RELATED APPLICATIONS

This application incorporates by reference and claims benefit of U.S. Provisional Patent Application Ser. No. 61/830,932 filed on Jun. 4, 2013, entitled "Financial Chat room Information Management System," U.S. Provisional Patent Application Ser. No. 61/840,259 filed on Jun. 27, 2013, entitled "Financial Chat room Information Management System," and U.S. Provisional Patent Application Ser. No. 61/934,695 filed on Jan. 31, 2014, entitled "Financial Messaging Platform Systems and Methods."

TECHNICAL FIELD

This disclosure relates generally to online chat systems, instant messengers, and online messaging platforms. More specifically, this disclosure relates to a financial messaging platform for communicating over the Internet and for isolating financial data from user messages.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Online and offline messaging platforms, such as text-based chats, provide a communication method where users can send and receive text messages in real-time. These platforms, typically, utilize tools such as instant messengers, talkers, Internet Relay Chats (IRC), web conferencing, and others that can be either web-based or downloadable applications. Online chats can be used for pleasure, such as when friends communicate to each other in real-time, and for business purposes, such as when a customer contacts a merchant or support service.

In the financial industry, online chats are used to exchange valuable, time-sensitive market information such as market strategies, market prices (bids and offers), and executed trades. However, existing chat room systems provide little in the way of managing and consolidating the relevant information submitted in chat logs. Instead, the relevant market data submitted by users is dispersed within irrelevant information, and a user must manually scroll through the individual messages to obtain the relevant information.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

The present technology generally provides for a financial messaging platform allowing a plurality of users to communicate with each other. The platform can flag and/or isolate user communications, which contain specific financial product related information. The platform also presents the flagged communications in a uniform manner such that the users can easily differentiate these types of messages in exchanged information (for example, the communications can be tagged with a specific and pre-defined icon and/or sound effect). Moreover, the flagged communications can be automatically tagged and/or aggregated into information pools to make it even more accessible by the users. The tagging allows communication that is more efficient by categorizing the flagged communications in terms of referring to them as a trade, order, or market communication. Once a trade, order, or market communication is tagged, it is insistently transferred to all affiliated information pools in the form of an isolated message. Information pools are virtual message aggregators associated with particular users, which consolidate isolated messages based on their characteristics, origin, and predetermined rules. Users can typically invite other users to contribute to a particular information pool or view only messages in the information pool. Within an information pool, the messages can also be parsed into sortable categories and be presented in a manner most suitable to analyzing. The platform can also include a compliance interface enabling particular compliance officers to oversee selected conversations between certain users in real-time and forbid suspect or inappropriate communications. The compliance interface can automatically monitor the use of selected keywords in all communications and alert the compliance officers when particular keywords are present in the communications. This allows for promptly managing multi-party chat room participation.

The present disclosure focuses on multiple inventive aspects and various embodiments of systems and methods for messaging. In particular, in one aspect, a method for messaging is provided. The method is executed by means of a computing device that comprises at least one processor and a memory storing program instructions executable by the at least one processor. The method may comprise the steps of providing a messaging platform through which a plurality of users communicate in real-time; communicating one or more communications from or to the plurality of users, where at least one of the received communications comprises a financial product related message having a financial product identification, a related market action identification, and a related price; isolating the one or more financial product related messages from the one or more received communications; and storing the isolated one or more financial product related messages in a searchable storage structure accessible by at least one of the plurality of users.

In some embodiments, the method further includes the step of flagging the one or more financial product related messages. The flagging of the one or more financial product related messages may comprise identifying the one or more financial product related messages and presenting the one or more financial product related messages in a uniform manner to the plurality of users. The presenting of the one or more financial product related messages in the uniform manner may include displaying uniform icons associated with the related market action identifications of the one or more financial product related messages and displaying related market action identifications and related prices of the one or more financial product related messages in a uniform manner. Moreover, the presenting of the one or more financial product related messages in the uniform manner may include providing one or more audio messages or sounds to indicate the one or more financial product related messages or a specific characteristic or a parameter of the one or more financial product related messages (for example, to indicate a type of a financial product related message such as an order message, a market message, or a trade message).

In some embodiments, the method further includes the steps of maintaining one or more information pools associated with the plurality of users and associating the financial product related message with at least one information pool related to a user who generated the financial product related message. In some embodiments, the method further includes the step of aggregating multiple financial product related messages in the at least one information pool, where the multiple financial product related messages are associated with the user who generated the multiple financial product related messages.

In some embodiments, the method further includes the step of consolidating multiple financial product related messages from the one or more information pools in a consolidated information pool. In yet more embodiments, the method further includes the step of automatically sorting the multiple financial product related messages in the consolidated information pool based on a category selected from the group comprising: time, a user, an information pool, a financial product identification, a related market action identification, and a related price.

In some embodiments, the method further includes the steps of creating an information pool based on an instruction of a first user, associating the first user and at least one other user with the information pool, receiving from the first user a selection of an access level associated with the at least one other user (the access level may include full access or view only), and providing access to the information pool for the at least one other user in accordance with the access level.

In some embodiments, the method further includes the step of displaying the isolated one or more financial product related messages on at least one user interface associated with at least one of the plurality of users. The isolating of the one or more financial product related messages can be based on the financial product identification, the related market action identification, the related price, or a combination thereof. The financial product identification may include a name or symbol of the financial product. The related market action identification can be selected from a group consisting of: a trade, an order, and a market. The related price may include a bid price or an ask price. For example, if the related market action identification is an order or a market, the related price may include a bid price and an ask price. In another example, if the related market action identification is a trade, the related price includes a final transaction price.

In some embodiments, the method further includes the steps of receiving a search limitation from at least one of the plurality of users (the search limitation can relate to a financial product identification, a related market action identification, a related price, a date range, a user, or a combination thereof), searching the searchable storage structure, producing a search result associated with the search limitation, and displaying the search result on a user interface associated with at least one of the plurality of users. Notably, different users may be entitled to various access levels. In other words, the users may access only that information from the searchable storage structure that the user is entitled to view and search.

In some embodiments, the method further includes the steps of providing a compliance interface accessible by a compliance officer only (where the compliance officer is selected from the plurality of users) and displaying through the compliance interface the one or more communications from the plurality of users other than the compliance officer.

In some embodiments, the method further includes the steps of receiving at least one target keyword from the compliance officer, monitoring the one or more communications from the plurality of users, determining that at least one of the communications from the plurality of users includes the at least one target keyword, and, based on the determination, alerting the compliance officer that the at least one of the communications is suspect. Further, the method may include the steps of receiving a command from the compliance officer, where the command is associated with at least one suspect user associated with the determined at least one communication, and restricting access to the messaging platform for the at least one suspect user. The restriction of access may include disabling an account of the at least one suspect user, flagging the at least one suspect communication, terminating the at least one suspect communication, and/or preventing use of the messaging platform by the at least one suspect user.

In some embodiments, the method further includes the steps of providing a user interface of the messaging platform to the plurality of users, where the user interface includes a chat window and at least one button enabling a user to create a financial product related message.

According to another aspect of the present disclosure, a messaging platform system is provided. The system comprises a processor and a memory coupled to the processor, where the memory is configured to store program instructions executable by the processor. In response to executing the program instructions, the processor is configured to: provide a messaging platform through which a plurality of users communicate in real-time; communicate one or more communications from the plurality of users, where at least one of the communications includes a financial product related message having a financial product identification, a related market action identification, and a related price; isolate the one or more financial product related messages from the one or more received communications; and store the isolated one or more financial product related messages in a searchable storage structure accessible by at least one of the plurality of users.

In some embodiments, the processor is further configured to provide a plurality of messaging platforms each having an associated plurality of users. Each of the at least one or more financial product related messages can be stored in the searchable storage structure associated with an information pool of users. The processor can also be configured to search the searchable storage structure and produce a search result, where the search result is related to the information pool, and where the search result is related to a financial product identification, a related market action identification, a related price, and combinations thereof. The messaging platform can be an online service accessible over the Internet and/or a downloadable software application.

According to yet another aspect of the present disclosure, a non-transitory processor-readable medium having instructions stored thereon is provided. The instructions, when executed by one or more processors, cause the one or more processors to implement a method comprising: providing a messaging platform through which a plurality of users communicate in real-time; communicating one or more communications from the plurality of users, where at least one of the communications comprises a financial product related message having a financial product identification, a related market action identification, and a related price; isolating the one or more financial product related messages from the one or more received communications; and storing the isolated one or more financial product related messages in a searchable storage structure accessible by at least one of the plurality of users. Other features, aspects, and exemplary embodiments are described below.

The present system and method for a financial messaging platform provide a number of advantages. For example, one advantage includes a highly efficient and easy to use system for managing relevant information in financial messaging platforms. A further advantage provides users with a searchable database of useful and relevant financial data obtained from users' messages in a messaging platform. Another advantage of the present system is isolating relevant financial information from various messages in a messaging platform. Yet another advantage of the present system is identifying, filtering, and organizing the large amount of information exchanged in chat rooms.

Additional objects, advantages, and novel features of the examples will be set forth in part in the description, which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
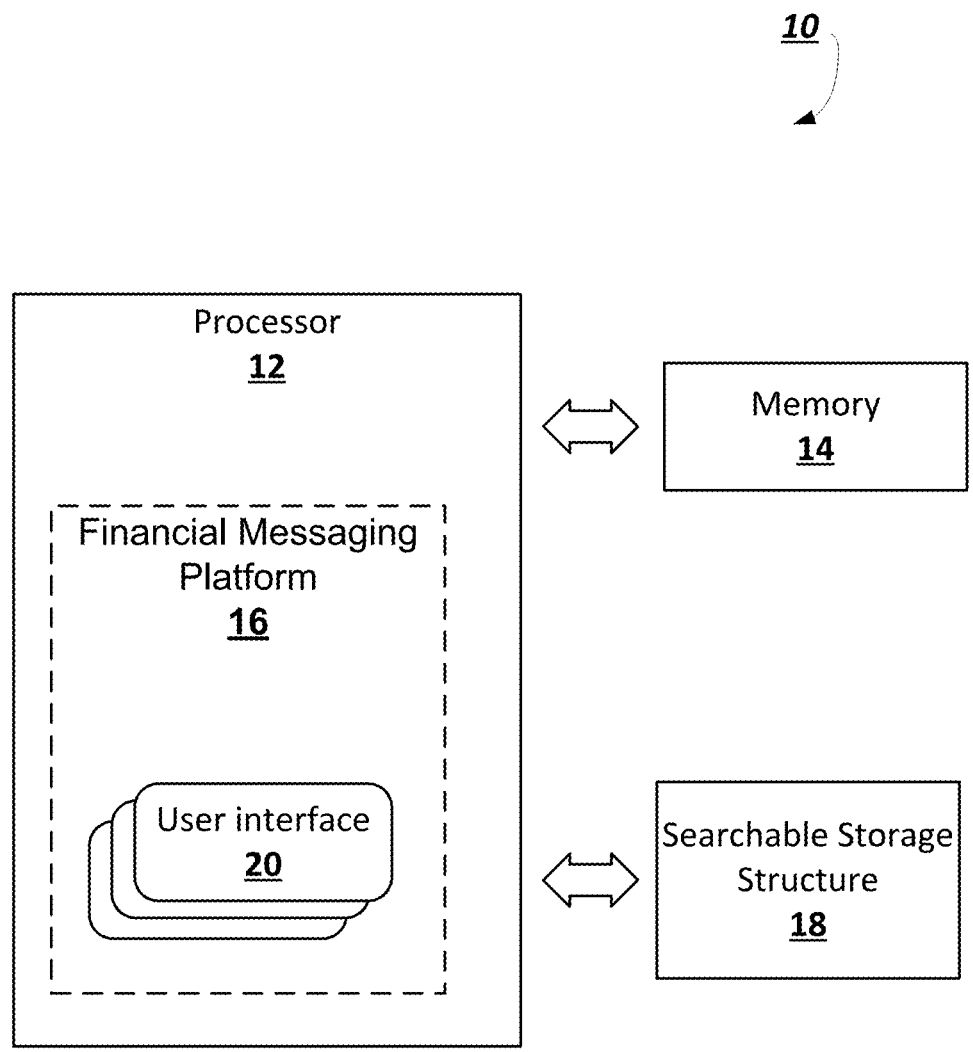
FIG. 1 shows a high-level block diagram of a messaging system, according to one example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure provides a financial messaging platform and associated methods and systems for information management and messaging through the financial messaging platform. According to the embodiments of the disclosure, the financial messaging platform may flag (tag) information as it is entered into the platform. Flagging may include identifying information of a particular information type, recording the information, and presenting the information in a uniform manner. For example, if a user inputs "I executed a trade of AAPL at $451.64," the platform may recognize the information as a trade, create a flagged record of the information within the message, and present the flagged message to selected users of the messaging platform in a uniform manner, such as, "TRADE: AAPL@ $451.64." The presentation may be generated by any graphics and/or sound associated with the information type. In one example, the platform provides a user with a structured input form to enter routine information types and communications to other users. For example, the platform may provide a user interface with an entry prompt for the user, where the entry prompt is associated with various information types. Examples of the various information types include stock symbols, strategy type, strategy level (whereas, a level can be a bid/ask or trade), strategy comments, bid price, ask price, and amount, among others. Further, upon identifying information of a particular type, the platform may record the information in a database that is searchable by information type, user, timestamp, among other search limitations.

In addition, the financial messaging platform may allow users to isolate flagged messages and consolidate them into various information pools. An information pool may gather and present any of the flagged messages of the various information types. Users may also sort the messages stored in the pool, filter related information, and share the messages with other users. For example, a user interested in "AAPL" may create an information pool to extract from an online chat all flagged messages with trade information related to "AAPL." In some embodiments, the result the user sees from this search will only be the ones that the user is entitled to access. It is important to mention that the created information pool will not be for all messages in the entire database of the platform that contain "AAPL," but only those that relate or are associated with the particular user or a group of users. For example, the user may not be entitled to view messages of other users, if he is not part of a specific information pool. The user may then share the information pool with another user who may be permitted to only view the information pool and not contribute to the information pool information. Alternatively, or in addition to, the user may share the information pool information with another user that may or may not have permission to contribute with relevant information to the information pool. Typically, the information that appears in information pools is based on the contributors of the information pool. For example, all relevant messages of contributors are shared in the information pool.

In some embodiments, a user may create multiple information pools related to two or more conversations of a user with two or more other users. In the embodiments, the platform may also maintain a consolidated information pool, which is configured to aggregate all isolated messages from the multiple information pools. In yet more embodiments, there may be provided a plurality of consolidated pools, which can be programmed to aggregate isolated messages of a certain type, origin, or nature. Within a consolidated information pool, isolated messages are aggregated and can be optionally sorted so that it is easy to analyze. For example, the isolated messages can be sorted chronologically and the best bid and offer can be highlighted.

In addition to above, the financial messaging platform may also include a compliance interface generally accessible by selected users such as compliance officers or other authorities. The compliance interface is designed to engage all users in fair and honest trading. For these ends, the compliance officers may review chat conversations between platform users in real time. Moreover, the compliance interface may automatically monitor user communications for the presence of preselected keywords or terms. In case of inappropriate or illegal conversations between users, the compliance officers are able to limit access of selected users to the platform, disable accounts/profiles, or simply flag any discussion deemed suspect, all through the compliance interface.

Notably, the financial messaging platform can be implemented as a downloadable software application, mobile application, web-based service, or a combination thereof. Regardless of the implementation, a system for messaging through the financial messaging platform is realized in computing devices, processors, controllers, mobile devices, logic devices, computer hardware, computer software, computer firmware, computer middleware, or a combination thereof. Accordingly, the system comprises at least one processor and a memory coupled to the processor, where the memory is configured to store program instructions executable by the processor. In response to executing the program instructions, the processor is configured to provide the financial messaging platform through which a plurality of users communicate in real time. In an example, the processor is configured to provide a plurality of financial messaging platforms each having an associated plurality of users. Some examples of the system for messaging include a computing device (e.g., desktop computer, laptop computer, tablet computer, smart phone), a server, backend service, distributed or cloud computing solution, and so forth.

Now, with reference to the drawings, FIG. 1 illustrates a high-level block diagram of messaging system 10, according to one example embodiment. In general, the messaging system 10 represents at least a part of a computing device such as a personal computer (PC), server, wireless phone, and the like. As discussed above, the messaging system 10 realizes a financial messaging platform allowing users to communicate with each other. The messaging system 10 is also capable of isolating specific financial related information from user communications, organizing the isolated information, and presenting the isolated information in an efficient and useful manner. The messaging system 10 also provides a number of graphical user interfaces enabling the users to utilize and operate the financial messaging platform.

In an embodiment, the system 10 comprises at least one processor 12 and at least one memory 14 operatively coupled to the processor 12. The memory 14 is configured to store program instructions executable by the processor 12. In response to executing the program instructions, the processor 12 provides a financial messaging platform 16 through which a plurality of users communicate in real-time. A plurality of users includes two or more users. In an example, the financial messaging platform 16 may be but not limited to a chat room or any instant messaging platform.

In some example embodiments, the processor 12 is configured to provide a plurality of financial messaging platforms 16 each having an associated plurality of users. The plurality of users associated with a messaging platform 16 may be prompted to log into the messaging platform 16. In other words, various financial messaging platforms 16 may be established for different groups of users. Further, a particular user may be a member of various financial messaging platforms 16.

The system 10 is further configured to receive one or more text-based communications from the plurality of users. The communications may be of any nature including text, icons, symbols, and so forth. Some of the communications may include financial product related messages or information. As described above, the processor 12 is configured to identify, flag, and isolate one or more financial product related messages from received communications, and store the isolated financial product related messages in a searchable storage structure 18 accessible by the plurality of users. In one example, the searchable storage structure 18 is a database in communication with the processor 12.

The users access the financial messaging platform 16 through one or more user interfaces 20 such as virtual or graphical user interfaces designed to enable the users to communicate with each other in an efficient manner. As explained below, the user interfaces 20 provide for chat rooms, information pool interfaces, compliance interfaces, settings interfaces, user profile interfaces, and so forth.

Figure 2:
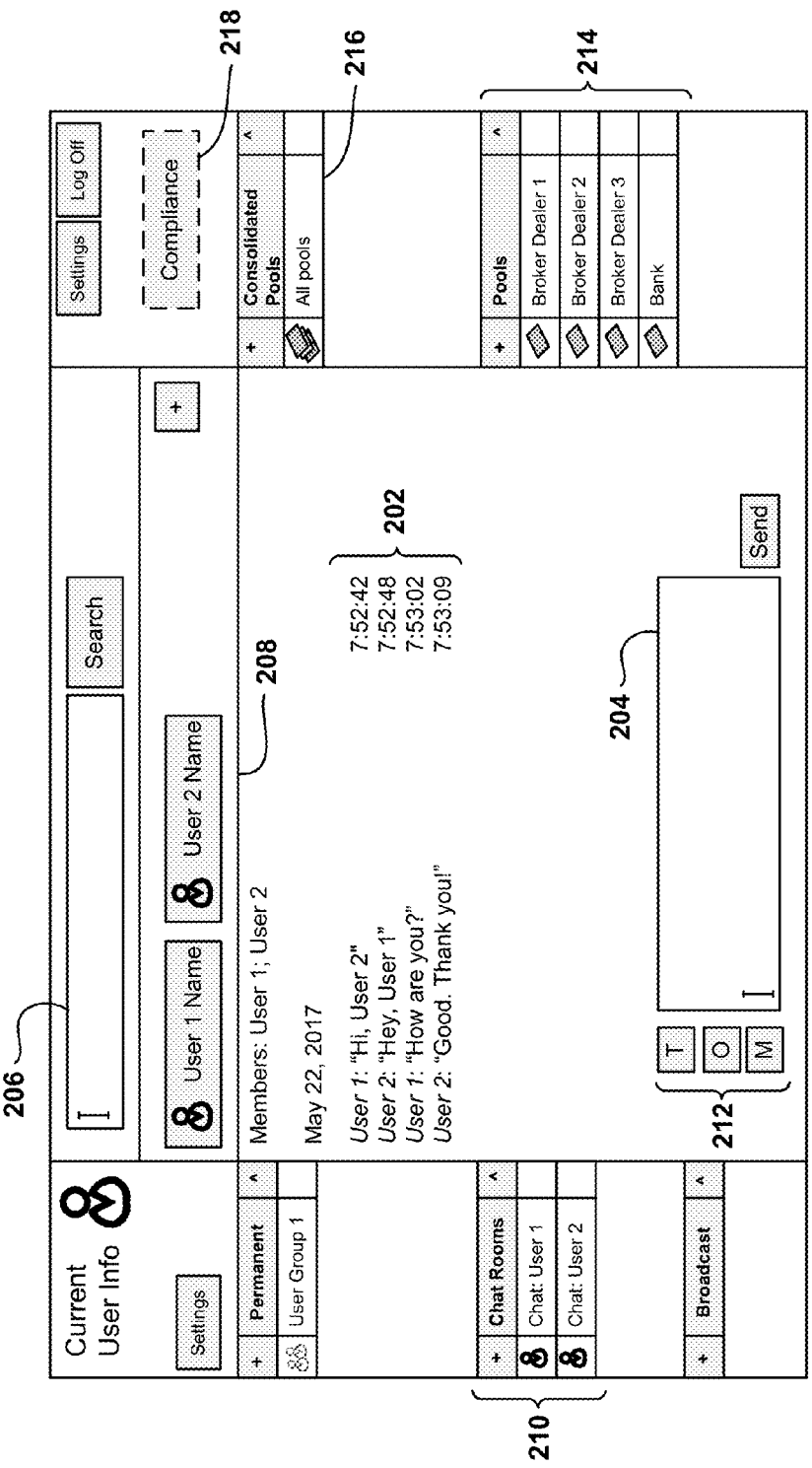
FIG. 2 shows a high-level diagram of an exemplary user interface of a messaging system illustrating a chat of two users.

For example, FIG. 2 shows a high-level diagram of exemplary user interface 200 of a messaging system illustrating a chat of two users. In particular, User 1 and User 2 have entered various communications 202 including, "Hi, User 1" and "How are you?" Typically, the users input communications through entry prompt 204.

According to the embodiments, a user may create a chat room with one other user or a group of users. In order to initiate a chat room, a particular user needs to find and select a second user of interest. For these ends, the user may utilize a search wizard 206 by simply entering a name of party of interest. Once at least one second user is selected for starting a conversation, the name(s) of at least one second user appear in a container 208. Further, the user may invite one or more other users to the already created chat room following the same procedure as described above. If a particular user is involved in multiple chat rooms, the user may switch between them by clicking an appropriate chat room button presented in a container 210.

As shown in FIG. 2, all communication between the users are time stamped and tagged. Because the conversations are stored in a memory, the users may later review prior conversations and communications in chronological order.

As mentioned above, the entry prompt 204 enables the users to create simple communications. In some embodiments, if a communication includes a particular financial product related information, such a communication may be automatically processed, tagged, flagged, and presented in a uniform manner. For example, a user inputs "I offer AAPL at $450" can be automatically identified as a financial product related message, flagged, and then presented in a uniform manner, such as, "BID: AAPL @ $450." This message can also be isolated and its copy can be stored in one or more information pools based on predetermined rules. The user, however, can create a financial product related message using one of the clickable buttons 212 shown as "T," "O," and "M," which stand for Trade, Order, and Market, respectively.

Figure 3:
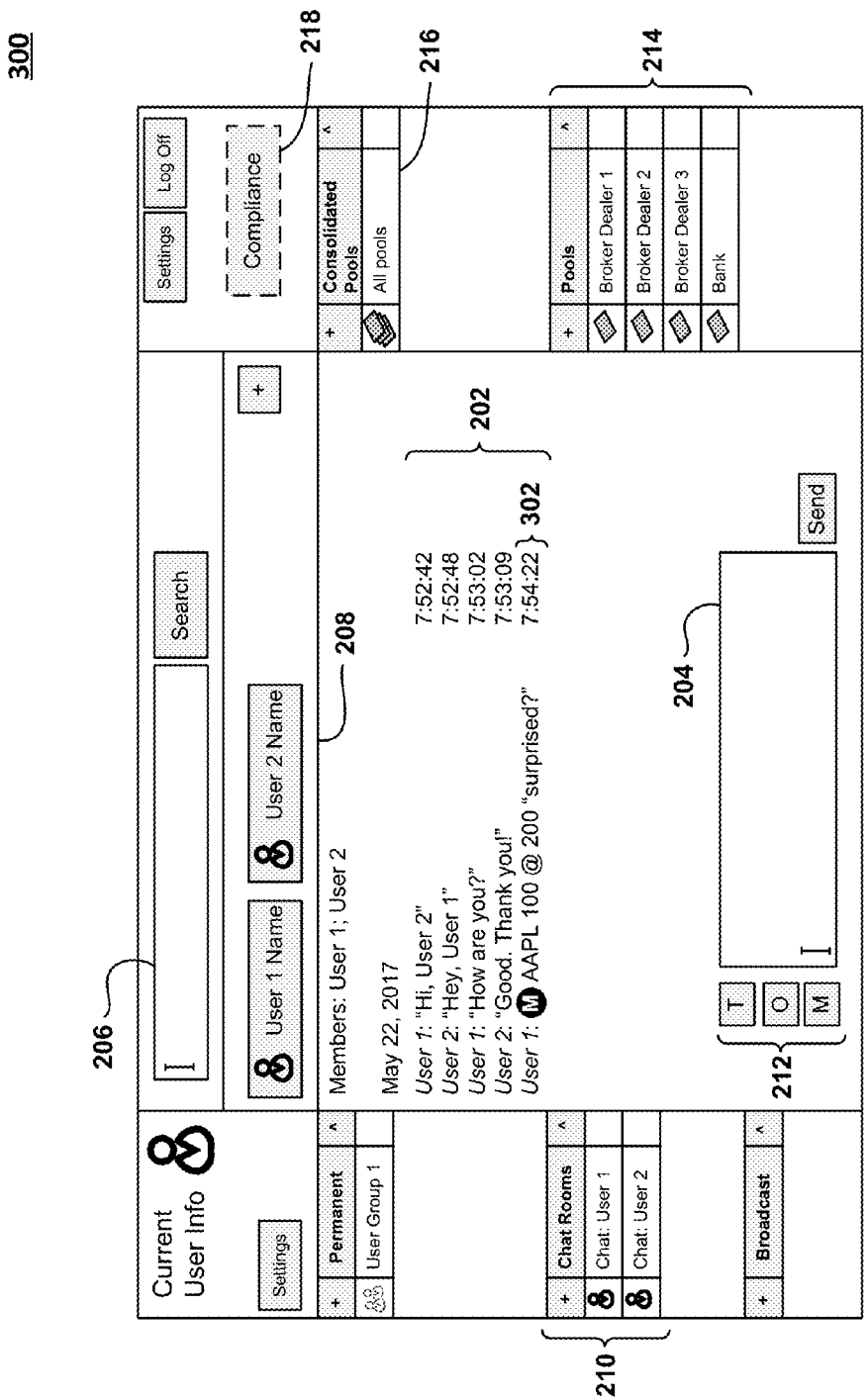
FIG. 3 shows a high-level diagram of an exemplary user interface of a messaging system illustrating chat communications including a financial product related message.

FIG. 3 shows a high-level diagram of exemplary user interface 300 of a messaging system illustrating chat communications including a financial product related message 302. In general, a financial product related message 302 includes a financial product identification, a related market action identification, and a related price. FIG. 3 depicts an example of financial product related message 302 entered by User 1 as "M APPL 100@ 200 surprised?." In an example embodiment, this message is transformed from User's 1 input (for example, "Are you surprised to see Apple stocks bid at $100 and offered for $200?"). Similar message as displayed can be created by filling in the text fields after the user has clicked on the clickable button "M" 212.

According to various embodiments, the financial product identification may be but not limited to any suitable subject matter that may be traded. Typically, the financial product identification may include a name, symbol, or description of financial product or service. For example, the financial product identification may be a stock identification (e.g., ticker symbol) corresponding to a specific company (e.g., AAPL for Apple, Inc.). However, the financial product identification is not limited to stocks, but may be but not limited to any tradable good, commodity, service, currency, financial instrument, contract, and so forth.

The related market action identification corresponds to one of three actions: Trade, Order, or Market. When the related market action identification is a Market (further indicated as "M"), the related market action identification indicates that the user is submitting the related price, which includes the current market value for a bid price and an ask price of the financial product identification at the present time. Not every user may have the same bid or ask price associated with a particular related market action identification at any given time.

When the related market action identification is a Trade (further indicated as "T"), the related market action identification indicates that the user successfully obtained a trade of the financial product identification at a related price. In other words, if the related market action identification is a Trade, the related price includes a transaction price.

When the related market action identification is an Order (further indicated as "O"), the related market action identification indicates that the user is interested in obtaining and trading (i.e., buying or selling) the financial product identification at a related price, where the related price includes a bid price and/or ask price. In other words, if the related market action identification is Order or Market, the related price includes a bid price and an ask price.

In some embodiments, the financial product related message may also include specific icons and optionally be accompanied by sounds. For example, an icon showing "T" symbol indicates that the message relates to a trade, an icon showing "O" symbol indicates that the message relates to an order or bid, while an icon showing "M" symbol indicates that the message relates to market information.

Figure 4:
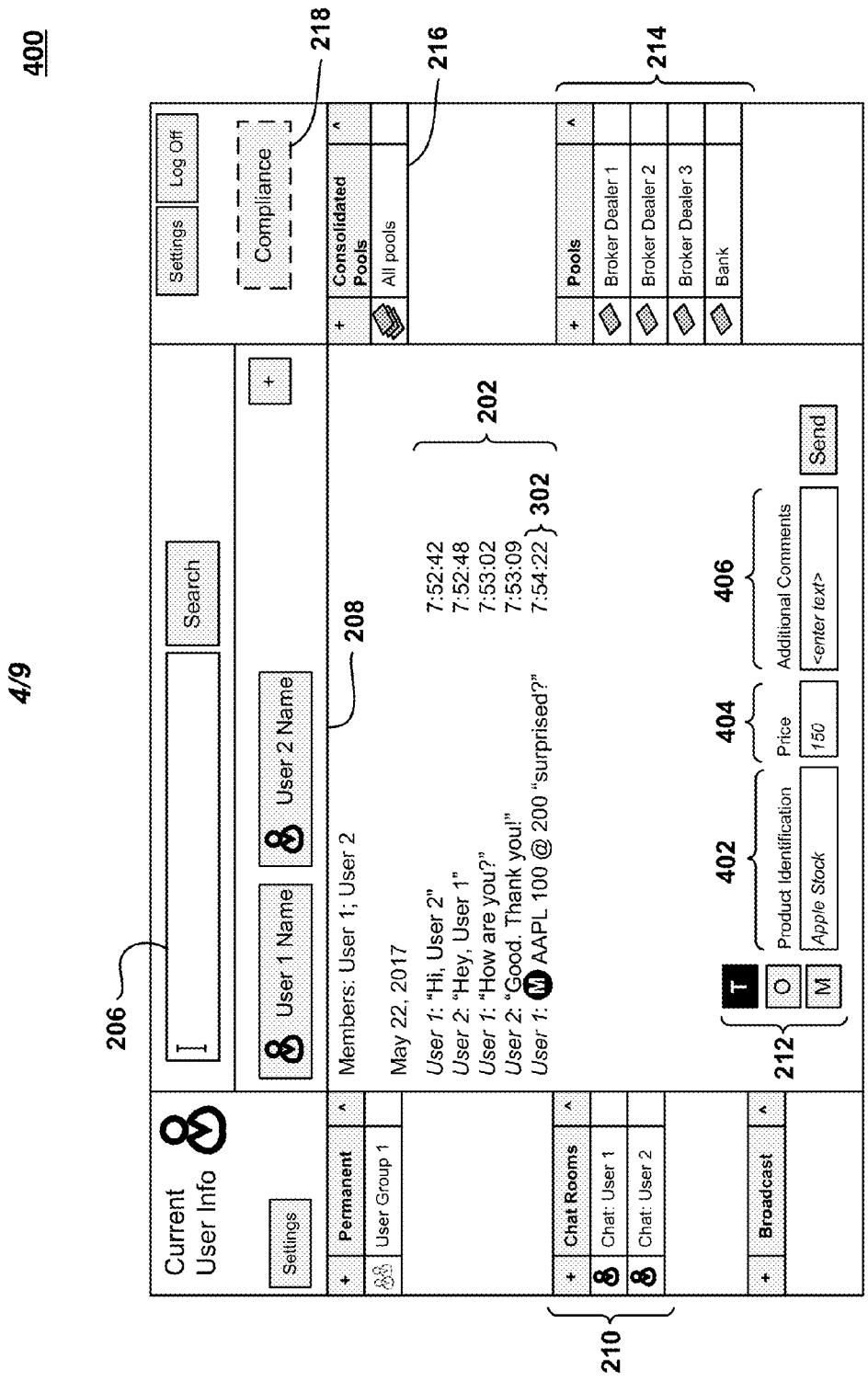
FIG. 4 shows a high-level diagram of an exemplary user interface of a messaging system illustrating a first interface for creating a financial product related message associated with a trade.

When a user clicks on one of the clickable buttons 212, the entry prompt 204 is transformed into several input fields. For example, FIG. 4 shows a high-level diagram of exemplary user interface 400 of a messaging system illustrating a first interface for creating a financial product related message associated with a trade. In particular, when the user clicks on "T" button 212, the entry prompt 204 is transformed into the first interface including a text field 402 for inputting a financial product identification, a text field 404 for entering a related price, and a text field 406 for entering optional comments. One example of a financial product related message created with the help of these text fields 402-406 is indicated by the reference numeral 408 (see FIG. 5).

As further shown by FIG. 4, User 1 entered information into the text fields for a new financial product related message, where the financial product identification is "Apple Stock," the related market action identification is "Trade," and the related price of "150" corresponding to the final transaction price for the trade of Apple Stock by User 1. This new financial product related message is shown by the reference numeral 408 in FIG. 5.

Figure 5:
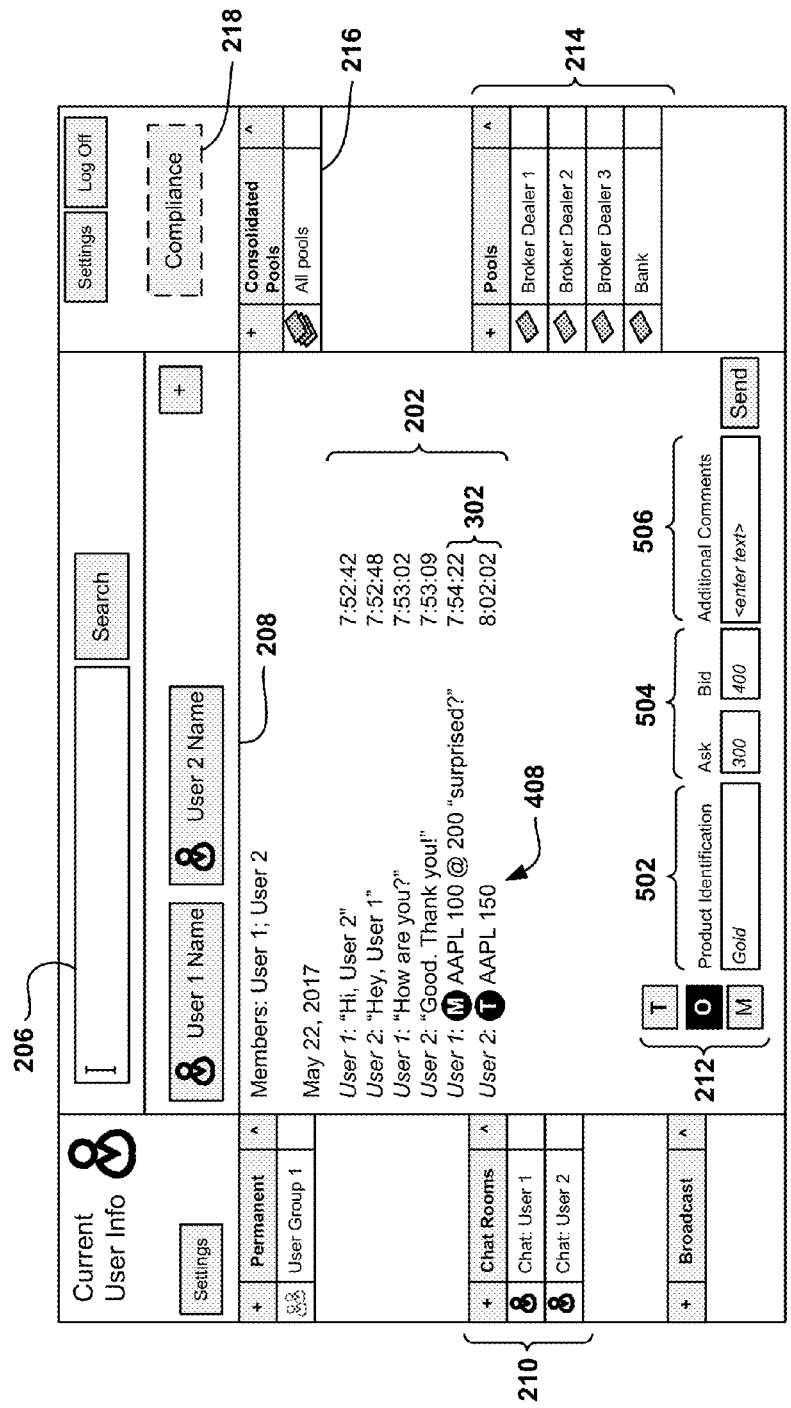
FIG. 5 shows a high-level diagram of an exemplary user interface of a messaging system illustrating a second interface for creating a financial product related message associated with an order or associated with a market message.

Similarly, FIG. 5 shows a high-level diagram of exemplary user interface 500 of a messaging system illustrating a second interface for creating a financial product related message associated with an order. In this example, when the user clicks on "O" or "M" button 212, the entry prompt 204 is transformed into the second interface including a text field 502 for inputting a financial product identification, two text fields 504 for entering a related price (bid or/and ask), and a text field 506 for entering optional comments. Also shown in FIG. 5 is User 1's submission of information into text fields that corresponds to a yet another financial product related message that indicates an "Order" by User 1 of "Gold" with an ask price of "300" and a bid price of "400."

In some embodiments, instead of entering the financial product related message 302 in distinct text boxes, the financial product related message 302 may be entered in a single entry prompt 204. For example, User 1 may enter "I would buy Apple Stock at 200 and sell at 300," as an Order. The display of the financial product related message entered by User 1 on the user interface may be "M Apple Stock 200@ 300."

According to various embodiments, the system 10 is capable of isolating financial product related messages 302 (such as shown in FIG. 3-5). The isolation of the financial product related messages can be based on a financial product identification, related market action identification, related price, origin (user), or combinations thereof. In other words, the system 10 may, for instance, be capable of isolating only the Trade ("T") financial product related messages from all of the communications that the user is entitled to access.

The system 10 may be further configured to display the isolated one or more financial product related messages 302 on at least one user interface associated with the plurality of users. Further, the display of the financial product related messages 302 may be accompanied by a user alert, such as an accompanying sound, acoustic message or color to indicate a new post. Users may also modify the financial product related messages 302 they submitted after they have been already displayed. The members of the financial messaging platform 16 may be notified of the change. Notably, the users can change the type of financial product related messages 302, such as to change "Trade" message to "Order" message or the like, but not the prices. In some instances, the users can also remove tags such as "T," "M," or "O." In either case, if the user wants to change the type of the financial product related messages 302 or remove a corresponding tag, the user may click on the message of interest so that a drop down menu is shown enabling the user to select an appropriate action. In some example embodiments, the users may need to click on a dedicated icon such as shown in the figures as a black circle with a "T," "M," or "O" letter inside the circle.

According to some embodiments, the isolation includes associating the isolated one or more financial product related messages 302 with one or more information pools 214. Thus, in a chat room, such as ones shown in FIG. 2-5, any conversation that includes a financial product related message is isolated and automatically duplicated or transferred to a corresponding information pool associated with the users of the particular chat room.

Within an information pool, the transferred data can be parsed into sortable categories. These may include the type of strategy and name, the strategy levels, contributors, and the message time stamp. The information can be grouped by type of strategy, where the most recent communication is displayed at the top. The use of information pools ultimately provides users with facilitated access to the information that counts, narrowing down user search for particular data.

Figure 6:
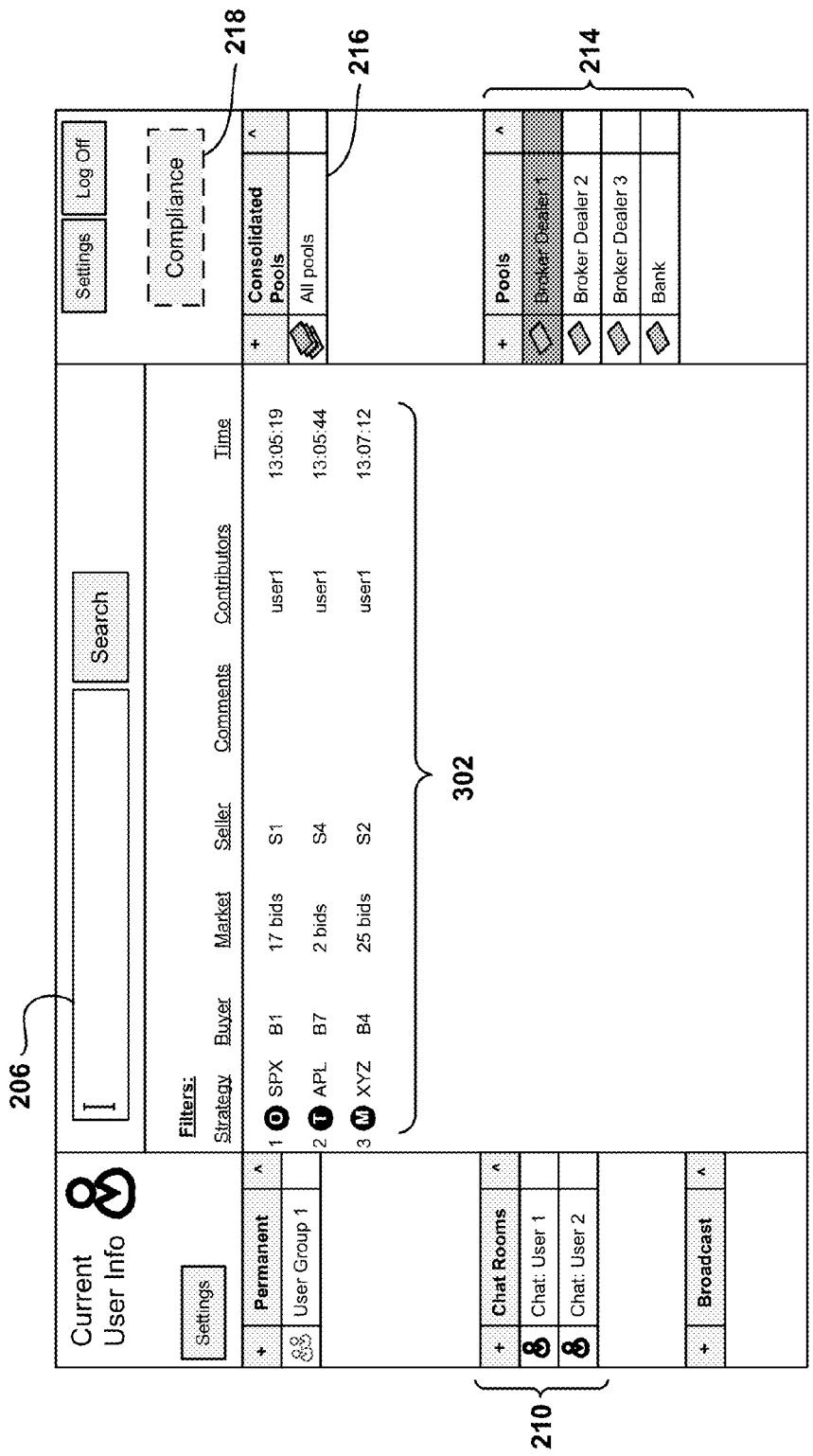
FIG. 6 shows a high-level diagram of an exemplary user interface of a messaging system illustrating an information pool containing a number of isolated financial product related messages.

FIG. 6 shows a high-level diagram of exemplary user interface 600 of a messaging system illustrating an information pool. As shown, the information pool includes a number of isolated financial product related messages 302 that correspond to the financial product identification and the related market action identification. In an example, only certain users may have authority to view the isolated financial product related messages 302. In another example, only particular users, such as senders, may have authority to not only view, but also manipulate and/or contribute with the isolated financial product related messages 302.

Figure 7:
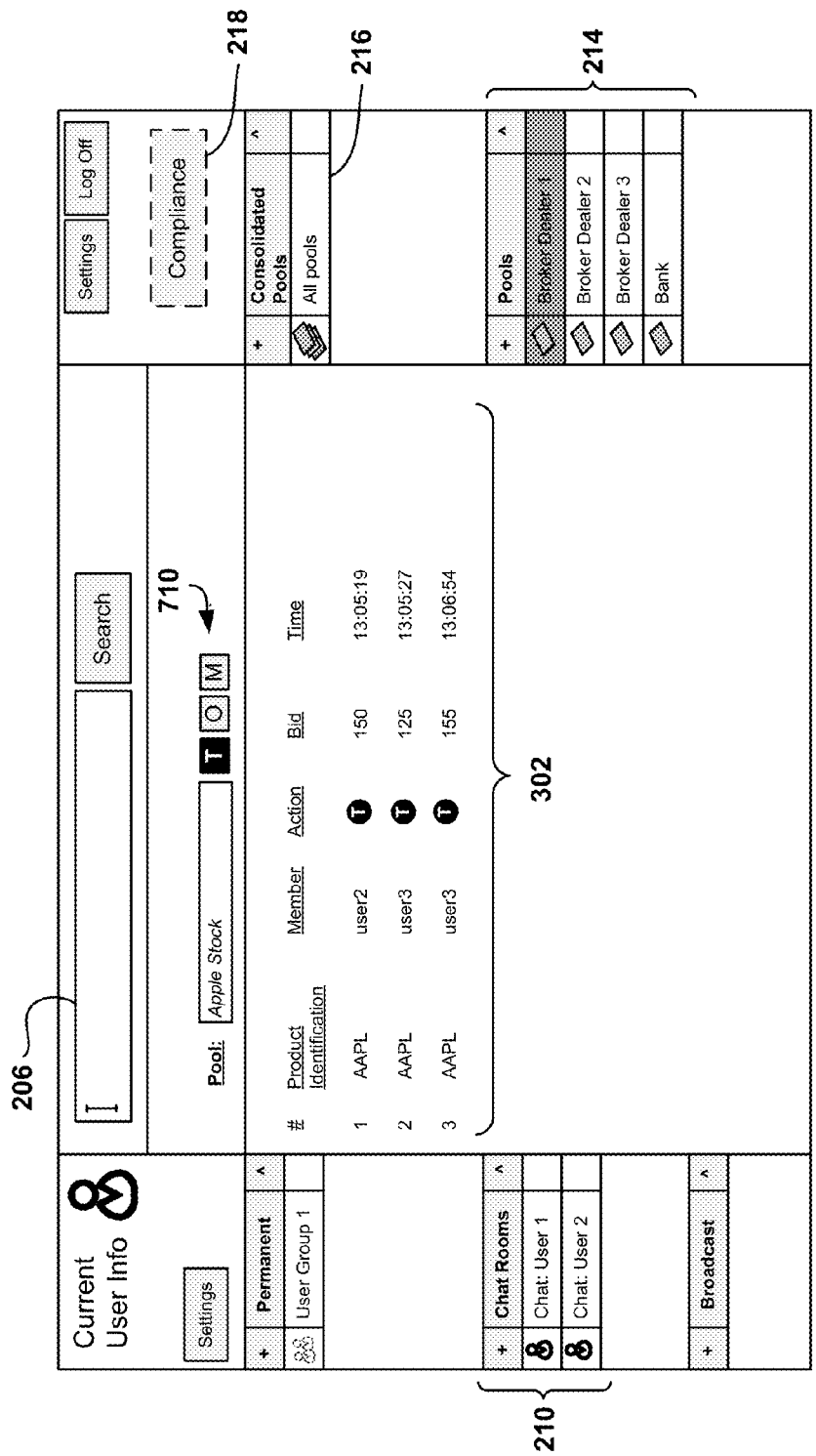
FIG. 7 shows a high-level diagram of an exemplary user interface of a messaging system illustrating an information pool containing a search result.

In exemplary embodiments, the system 10 is configured to receive a search limitation 710 from at least one of the plurality of users and produce a search result associated with the search limitation as shown in FIG. 7. The search limitation 710 may be related to a financial product identification 702, a related market action identification 704, a related price 706, a date range, a user, or a combination thereof. For example, in FIG. 7, the search limitation 710 includes financial product identification 702 of "Apple Stock" and the related market action identification 704 of "Trade." In addition, the system 10 may be configured to display the search result 708 on a user interface associated with at least one of the plurality of users.

According to various embodiments, the system 10 is also configured to allow users to create information pools 214. Users can create a custom name for the information pool, identify contributors of the information pool, and select specific users that have authority to view the information pool 214. An information pool 214 may be created that captures all of the financial product related messages 302 submitted by one or more specific users assigned as contributors to this information pool. Another information pool 214 may be created to capture all of the financial product related messages 302 related to a certain financial product information or a specific related market action identification. Users may then filter the data displayed in the information pools 214 by any number of factors. Typically, the filtering of information pools is according to date and market action identification.

Alternatively, or in addition to, each of the at least one or more financial product related messages 302 stored in the searchable storage structure 18 may be associated with an information pool 214 of users. As such, the processor 12 may search the searchable storage structure 18 based on a certain information pool 214.

For example, a user who is a member of multiple information pools 214 may be interested in certain financial product information or a specific related market action identification. For example, if the user was interested in the best offer price related to a certain stock, the system 10 may aggregate the information in various information pools 214 to which a user is a member, and present the aggregated data on a user interface. The aggregated data may include strategy, which information pool 214 the information came from, associated price, which information pool 214 the user should contact in order to proceed with a trade, and the time and related price of any previous trades.

According to some embodiments, one of the user interfaces may include at least one consolidated information pool 216. The consolidated information pool 216 may automatically aggregate and optionally duplicate all financial product related messages 302 from all existing information pools 214. The user may access consolidated information pool 216 to review and analyze all trades and offers for a certain period, analyze trade strategies and trends, and so forth. As in the information pool 214, the consolidated information pool 216 allows to filter content, sort content, and run informational searches.

Figure 8:
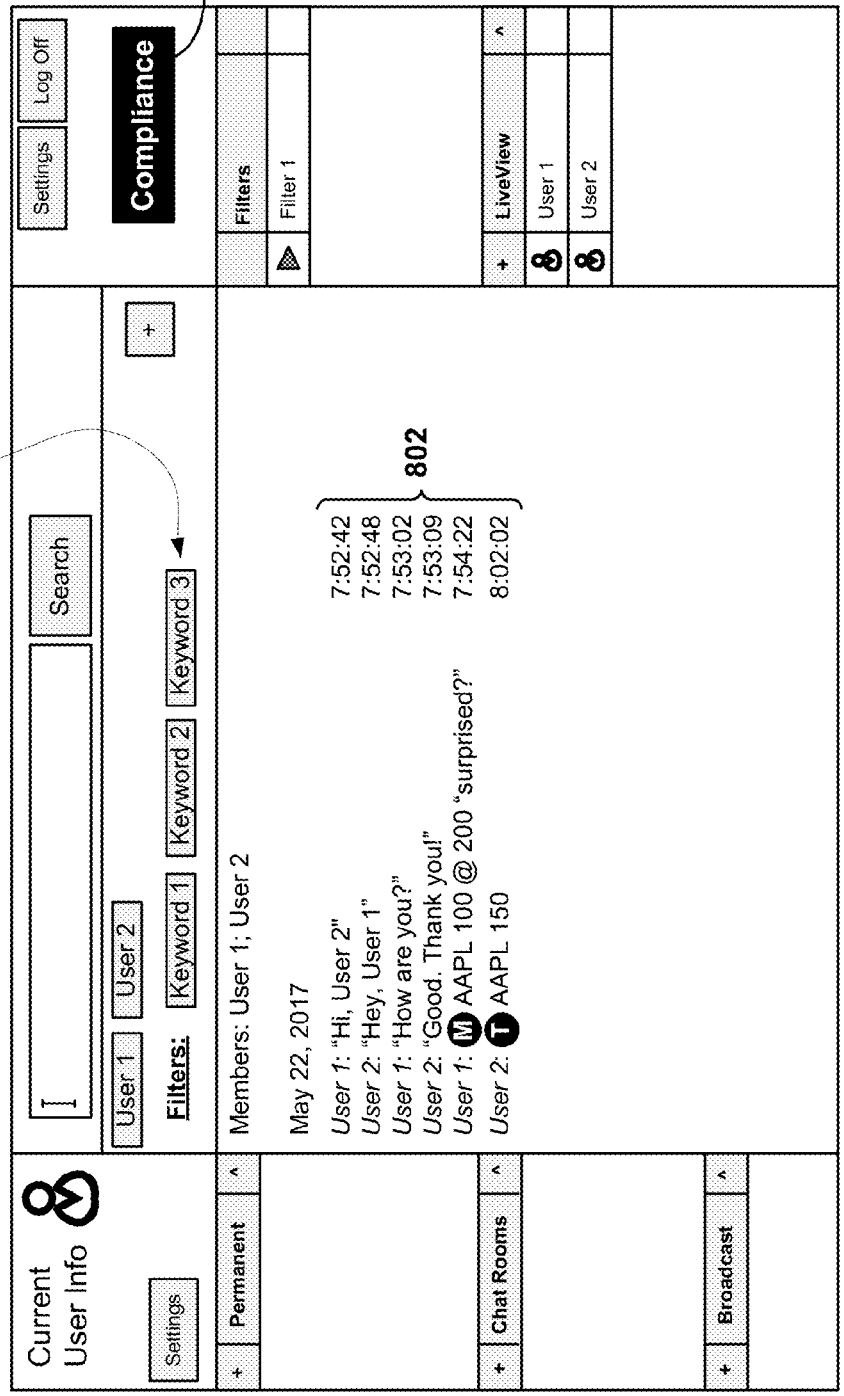
FIG. 8 shows a high-level diagram of an exemplary compliance interface of a messaging system.

Referring again to FIG. 2, in some embodiments, the user interface 200 may optionally include a clickable button "Compliance" 218. This option can be provided to selected users only, such as compliance officers or moderators. Once this button is activated, a compliance officer is provided with a compliance interface 800 shown in FIG. 8.

The compliance interface 800 allows the compliance officer to select and review any chat room or conversation between users of the system 10 such that the users are not notified about the reviewing process. For example, the compliance interface 800 includes a container 802 for viewing discussions of selected users. This feature makes the messaging system 10 ethical for individuals and engages them in fair, honest, and legal trading. The compliance officer can monitor and oversee any user communication in real time. In case of suspect communication, the compliance officer is able to restrict or limit access to the system 10 for particular users, disable accounts or profiles of certain users, or flag any discussion or communication between particular users.

Moreover, in certain embodiments, the compliance interface 800 includes a widget 804 for inputting one or more keywords. Some examples of keywords may include "resign," "quit," "hate," and the like. With this widget 804, a compliance officer may provide keywords or terms, which usage the system 10 will monitor in all user communications in real time. Once a particular keyword is detected or identified in any user communications in any of the chat rooms, the compliance interface 800 may alert the compliance officer. In addition, the container 802 may show the suspect communication or chat room where a particular keyword was detected.

Now, with reference to FIG. 1, the system 10 is in direct communication with the searchable storage structure 18, which, in one example, may be a database. Of course, in other embodiments, the system 10 may be in communication with the database through a network. While shown and described as a database, it is understood that the database may be any number of databases adapted to support the necessary data management to support the various features and functions of the system 10 described herein. It is further contemplated that a database, as understood in the traditional sense, may not be a requirement of the system 10 described herein, and that any other mechanism or mode of data management may be employed.

As shown in FIG. 1, aspects of the systems described herein are controlled by one or more processors 12. The one or more processors 12 may be adapted to run a variety of application programs, access and store data, including accessing and storing data in associated databases, and enable one or more interactions as described herein. Typically, the one or more processors 12 are implemented by one or more programmable data processing devices. The hardware elements, operating systems, and programming languages of such devices are conventional in nature, and it is presumed that those skilled in the art are adequately familiar therewith.

For example, the one or more processors 12 may be but not limited to a PC based implementation of a central control processing system utilizing a central processing unit (CPU), memory 14, and an interconnect bus. The CPU may contain a single microprocessor, or it may contain a plurality of microprocessors for configuring the CPU as a multi-processor system. The memory 14 includes a main memory, such as a dynamic random access memory (DRAM) and cache, as well as a read only memory, such as a PROM, EPROM, FLASH-EPROM, or the like. The system 10 may also include any form of volatile or non-volatile memory 14. In operation, the memory 14 stores at least portions of instructions for execution by the CPU and data for processing in accord with the executed instructions.

The one or more processors 12 may also include one or more input/output interfaces for communications with one or more processing systems. Although not shown, one or more such interfaces may enable communications via a network, e.g., to enable sending and receiving instructions electronically via the Internet, cellular network, or any other communication link. The communication links may be wired or wireless.

The one or more processors 12 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, etc.) serving as one or more user interfaces for the one or more processors 12. For example, the one or more processors 12 may include a graphics subsystem to drive the output mechanism. The links of the peripherals to the system may be wired connections or use wireless communications.

Although summarized above as a PC-type implementation, those skilled in the art will recognize that the one or more processors 12 also encompass systems such as host computers, servers, workstations, network terminals, and the like. Further, one or more processors 12 may be embodied in a device, such as a mobile electronic device, like a smartphone or tablet computer. In fact, the use of the term processor 12 is intended to represent a broad category of components that are well known in the art.

Hence, aspects of the systems and methods provided herein encompass hardware and software for controlling the relevant functions. Software may take the form of code or executable instructions for causing the one or more processors 12 or other programmable equipment or logic to perform the relevant steps, where the code or instructions are carried by or otherwise embodied in a medium readable by the one or more processors 12 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include, for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a processor 12 can read programming code and/or data. Many of these forms of computer readable media may be involved in carrying one or more sequences of one or more instructions to a processor for execution.

Figure 9:
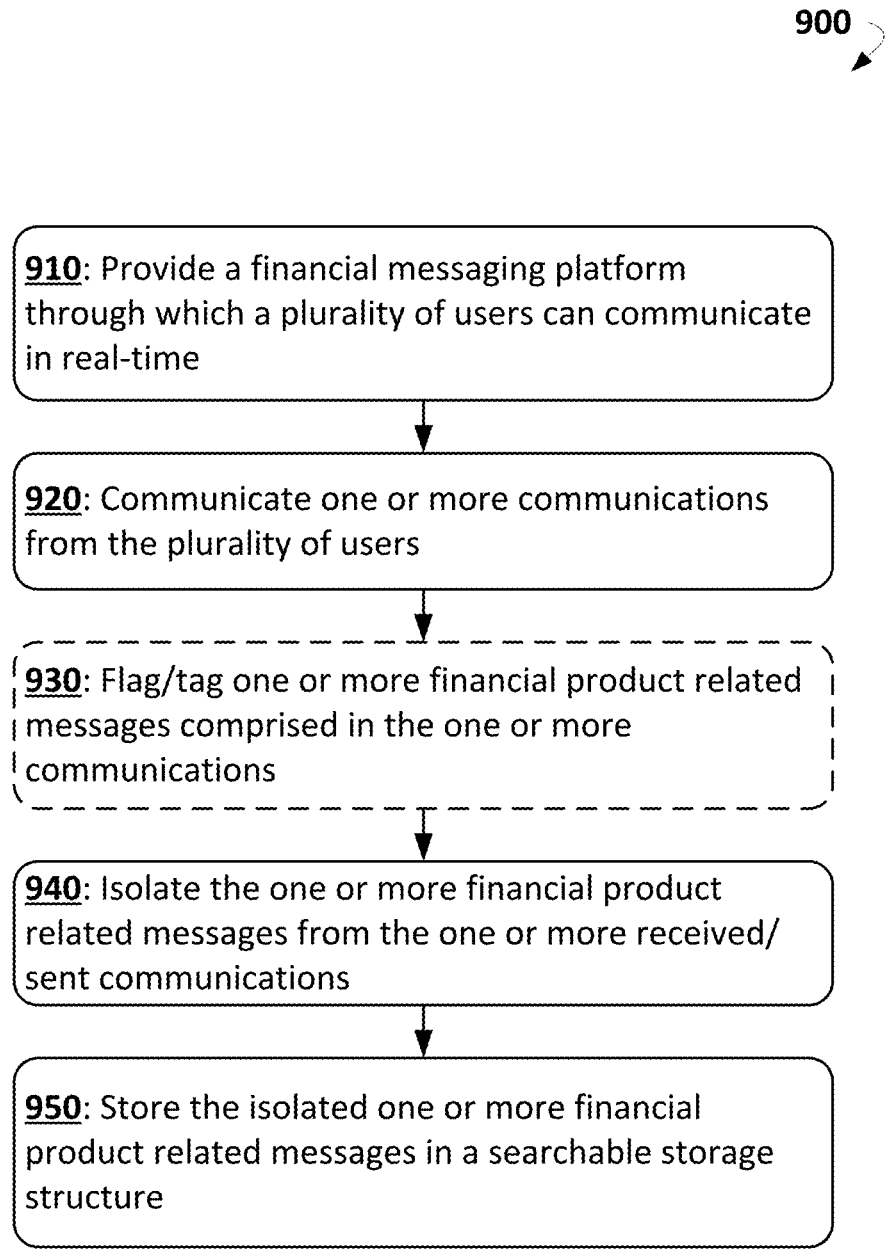
FIG. 9 shows a high-level process flow diagram of a method for messaging according to one exemplary embodiment.

FIG. 9 shows a high-level process flow diagram of a method 900 for messaging, according to one exemplary embodiment. The method 900 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 900 is implemented by the system 10 shown in FIG. 1; however, it should be appreciated that the method 900 is just one example operation of the system 10. In addition, the below recited steps of the method 900 may be implemented in an order different than described and shown in FIG. 9. Moreover, the method 900 may have additional steps not shown herein, but which can be evident for those skilled in the art from the present disclosure. The method 900 may also have fewer steps than outlined below and shown in FIG. 9.

The method 900 commences at operation 910 with the system 10 providing a financial messaging platform 16 through which a plurality of users can communicate in real-time. The financial messaging platform 16 includes a number of user interfaces 20 as discussed and shown above.

At operation 920, the system 10 communicates (i.e., receives or sends) one or more communications from the plurality of users. Notably, at least one of the received communications may include a financial product related message. A financial product related message, according to embodiments of the disclosure, includes a financial product identification, a related market action identification, and a related price. In certain embodiments, the financial product identification includes a name or symbol of the financial product. The related market action identification can be selected from the group consisting of: a trade, an order, and a market. Lastly, the related price may include a bid price or an ask price. For example, if the related market action identification is an order or a market, the related price includes a bid price and an ask price. In another example, if the related market action identification is a trade, the related price includes a final transaction price.

At optional operation 930, the system 10 may flag (or tag) the one or more financial product related messages. The process of flagging may include the steps of identifying the one or more financial product related messages and presenting, through a user interface 20, the one or more financial product related messages in a uniform manner to the plurality of users. For example, presenting the one or more financial product related messages in the uniform manner may include displaying uniform icons associated with the related market action identifications of the one or more financial product related messages. In addition, mentioned presenting may include displaying related market action identifications and related prices of the one or more financial product related messages in a uniform manner as discussed above.

At operation 940, the system 10 isolates the one or more financial product related messages from the one or more received/sent communications. The process of isolating can be based on the financial product identification, the related market action identification, the related price, or a combination thereof.

At operation 950, the system 10 stores the isolated one or more financial product related messages in a searchable storage structure accessible by the plurality of users. In some embodiments, the searchable storage structure may include one or more information pools, which can be associated with particular users (e.g., users who created or viewed the stored financial product related messages). In this regard, the system 10 may associate the financial product related message with at least one information pool related to a user who generated the financial product related message. The operation 950 may further include the step of displaying the isolated one or more financial product related messages on at least one user interface.

Importantly, the searchable storage structure may further aggregate multiple financial product related messages in the at least one information pool, where the multiple financial product related messages are associated with the user who generated these financial product related messages. In some embodiments, the system 10 may also consolidate multiple financial product related messages from the one or more information pools in a consolidated information pool.

Within an information pool or consolidated information pool, multiple financial product related messages can be sorted or filtered based on a category selected from the group comprising: time, user, information pool, financial product identification, related market action identification, and related price.

In certain embodiments, the method 900 may further enable users to create one or more information pools and/or one or more consolidated information pools. For these ends, the method 900 may include the steps of creating an information pool based on an instruction of a first user, associating the first user and at least one other user with the information pool, receiving from the first user a selection of an access level associated with the at least one other user (where the access level includes full access or view only), and providing access to the information pool for the at least one other user in accordance with the access level.

Thus, systems and methods for messaging have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

What is claimed is:

1. A method for messaging, the method comprising:
providing, by means of a computing device comprising at least one processor and a memory storing program instructions executable by the at least one processor, a messaging platform through which a plurality of users communicate in real-time;
communicating, by means of the computing device, one or more communications from or to the plurality of users, wherein at least one of the communications comprises a financial product related message entered by one of the plurality of users, wherein the financial product related message comprises:
a financial product identification,
a related market action identification; and
a related price;
analyzing the financial product related message to:
determine, based on the related market action identification entered by the one of the plurality of users in the financial product related message, a type of the financial product related message, and
select a tag for the financial product related message, the tag including an icon selected from icons pre-dedicated, by the at least one processor, for each of a plurality of types of financial product related messages of the messaging platform, the icon being selected based on the type of the financial product related message;
based on the financial product related message and the tag, flagging the financial product related message, wherein the flagging includes generating, based on the financial product related message and the tag, a tagged financial product related message in a structured form associated with a searchable storage structure accessible by at least one of the plurality of users, wherein the structured form of the tagged financial product related message comprises at least the tag, a financial product identification information selected based on the financial product identification entered by the one of the plurality of users in the financial product related message, and the related price;
replacing the financial product related message with the tagged financial product related message in the at least one of the communications;
displaying, by means of the computing device, the tagged financial product related message on at least one user interface associated with the at least one of the plurality of users, wherein the displaying includes displaying the icon, the financial product identification information, and the related price;
isolating, by means of the computing device, the tagged financial product related message from the at least one of the communications; and
storing, by means of the computing device, the isolated tagged financial product related message in the searchable storage structure accessible by the at least one of the plurality of users to enable the at least one of the plurality of users to search for the tagged financial product related message based on one or more of the tag, the financial product identification information, and the related price of the structured form of the tagged financial product related message;
in response to the displaying the tagged financial product related message to the plurality of users, receiving, from one or more users of the plurality of users, a request to perform a market action indicated by the icon of the tagged financial product related message;
automatically changing the tag of the tagged financial product related message in response to an input of the one of the plurality of users to change the type of the financial product related message by:
receiving, from the one of the plurality of users, a selection of the financial product related message;

receiving, from the one of the plurality of users, a further related market action identification for the financial product related message, the further related market action identification indicating a further type of the financial product related message;

based on the further related market action identification, selecting a further icon from the icons pre-dedicated for each of the plurality of types of the financial product related messages;

generating a modified tagged financial product related message by replacing, in the tagged financial product related message, the icon with the further icon; and replacing the tagged financial product related message with the modified tagged financial product related message to display the modified tagged financial product related message on the at least one user interface; and in response to the displaying the modified tagged financial product related message to the plurality of users, receiving, from one or more further users of the plurality of users, a request to perform a further market action indicated by the further icon of the modified tagged financial product related message.

2. The method of claim 1, wherein the flagging of the financial product related message further comprises:
identifying, by means of the computing device, the financial product related message.

3. The method of claim 1, wherein the icon is associated with related market action identifications of the financial product related message; and
wherein the displaying the tagged financial product related message further comprises displaying, by means of the computing device, the related market action identifications and related prices of the financial product related message in a uniform manner.

4. The method of claim 1, wherein the replacing of the financial product related message further comprises providing one or more audio messages or sounds, by means of the computing device, to indicate the financial product related message or a characteristic of the financial product related message.

5. The method of claim 1, further comprising:
maintaining, by means of the computing device, one or more information pools associated with the plurality of users; and
associating, by means of the computing device, the financial product related message with at least one information pool related to a user who generated the financial product related message.

6. The method of claim 5, further comprising aggregating, by means of the computing device, multiple financial product related messages in the at least one information pool, wherein the multiple financial product related messages are associated with the user who generated the multiple financial product related messages.

7. The method of claim 6, further comprising consolidating, by means of the computing device, the multiple financial product related messages from the one or more information pools in a consolidated information pool.

8. The method of claim 6, further comprising automatically sorting, by means of the computing device, the multiple financial product related messages in the consolidated information pool based on a category selected from the group comprising: time, a user, an information pool, the financial product identification information, a related market action identification, and a related price.

9. The method of claim 1, further comprising:
creating, by means of the computing device, an information pool based on an instruction of a first user;
associating, by means of the computing device, the first user and at least one other user with the information pool;
receiving from the first user, by means of the computing device, a selection of an access level associated with the at least one other user, wherein the access level includes full access or view only; and
providing access, by means of the computing device, to the information pool for the at least one other user in accordance with the access level.

10. The method of claim 8, wherein the isolating of the financial product related message is based on the financial product identification information, the related market action identification, the related price, or a combination thereof.

11. The method of claim 1, wherein the financial product identification information includes a name or symbol of the financial product.

12. The method of claim 8, wherein the related market action identification is selected from the group consisting of: a trade, an order, and a market.

13. The method of claim 8, wherein the related price includes a bid price or an ask price.

14. The system of claim 8, wherein, if the related market action identification is an order or a market, the related price includes a bid price and an ask price.

15. The method of claim 8, wherein, if the related market action identification is a trade, the related price includes a final transaction price.

16. The method of claim 1, further comprising:
receiving, by means of the computing device, a search limitation from at least one of the plurality of users, wherein the search limitation is related to: the financial product identification information, a related market action identification, a related price, a date range, a user, or a combination thereof; and
producing, by means of the computing device, a search result associated with the search limitation.

17. The method of claim 1, further comprising:
searching, by means of the computing device, the searchable storage structure and producing a search result, wherein the search result is related to the financial product identification information, a related market action identification, a related price, or a combination thereof; and
displaying, by means of the computing device, the search result on a user interface associated with at least one of the plurality of users.

18. The method of claim 1, wherein the searchable storage structure is a database in communication with the at least one processor.

19. The method of claim 1, further comprising:
providing, by means of the computing device, a compliance interface accessible by a compliance officer only, wherein the compliance officer is selected from the plurality of users; and
displaying, by means of the computing device and through the compliance interface to the compliance officer, the one or more communications from the plurality of users other than the compliance officer.

20. The method of claim 18, further comprising:
receiving, by means of the computing device, at least one target keyword from the compliance officer;
monitoring, by means of the computing device, the one or more communications from the plurality of users;

determining, by means of the computing device, that at least one of the communications from the plurality of users includes the at least one target keyword; and based on the determination, alerting, by means of the computing device, the compliance officer that that the at least one of the communications is suspect.

21. The method of claim 19, further comprising:

receiving, by means of the computing device, a command from the compliance officer, wherein the command is associated with at least one suspect user associated with the determined at least one communication; and restricting, by means of the computing device, access to the messaging platform for the at least one suspect user, wherein the restricting access comprises at least one of the following: disabling an account of the at least one suspect user, flagging the at least one suspect communication, terminating the at least one suspect communication, and preventing the use of the messaging platform by the at least one suspect user.

22. The method of claim 1, further comprising providing, by means of the computing device, a user interface of the messaging platform to the plurality of users, wherein the user interface includes a chat window and at least one button enabling a user to create the financial product related message.

23. A messaging system comprising:

a processor;

a memory coupled to the processor, wherein the memory is configured to store program instructions executable by the processor;

wherein in response to executing the program instructions, the processor is configured to:

provide a messaging platform through which a plurality of users communicate in real-time;

communicate one or more communications from or to the plurality of users, wherein at least one of the communications includes a financial product related message entered by one of the plurality of users, wherein the financial product related message includes:

a financial product identification;

a related market action identification; and a related price;

analyze the financial product related message to:

determine, based on the related market action identification entered by the one of the plurality of users in the financial product related message, a type of the financial product related message, and select a tag for the financial product related message, the tag including an icon selected from icons pre-dedicated, by the processor, for each of a plurality of types of financial product related messages of the messaging platform, the icon being selected based on the type of the financial product related message;

based on the financial product related message and the tag, flag the financial product related message, wherein the flagging includes generating, based on the financial product related message and the tag, a tagged financial product related message in a structured form associated with a searchable storage structure accessible by at least one of the plurality of users, wherein the structured form of the tagged financial product related message comprises at least the tag, a financial product identification information selected based on the financial product identification entered by the one of the plurality of users in the financial product related message;

replace the financial product related message with the tagged financial product related message in the at least one of the communications;

display the tagged financial product related message on at least one user interface associated with the at least one of the plurality of users, wherein the displaying includes displaying the icon, the financial product identification information, and the related price;

isolate the tagged financial product related message from the at least one of the communications; and store the isolated tagged financial product related message in the searchable storage structure accessible by the at least one of the plurality of users to enable the at least one of the plurality of users to search for the tagged financial product related message based on one or more of the tag, the financial product identification information, and the related price of the structured form of the tagged financial product related message;

in response to the displaying the tagged financial product related message to the plurality of users, receive, from one or more users of the plurality of users, a request to perform a market action indicated by the icon of the tagged financial product related message;

automatically change the tag of the tagged financial product related message in response to an input of the one of the plurality of users to change the type of the financial product related message by:

receiving, from the one of the plurality of users, a selection of e financial product related message;

receiving, from the one of the plurality of users, a further related market action identification for the financial product related message, the further related market action identification indicating a further type of the financial product related message;

based on the further related market action identification, selecting a further icon from the icons pre-dedicated for each of the plurality of types of the financial product related messages;

generating a modified tagged financial oduct related message by replacing, in the tagged financial product related message, the icon with the further icon; and replacing the tagged financial product related message with the modified tagged financial product related message to display the modified tagged financial product related message on the at least one user interface; and in response to the displaying the modified tagged financial product related message to the plurality of users, receive, from one or more further users of the plurality of users, a request to perform a further market action indicated by the further icon of the modified tagged financial product related message.

24. The system of claim 22, wherein the processor is further configured to provide a plurality of messaging platforms each having an associated plurality of users.

25. The system of claim 22, wherein the tagged financial product related message stored in the searchable storage structure is associated with an information pool of users.

26. The system of claim 24, wherein the processor is configured to search the searchable storage structure and produce a search result, wherein the search result is related to the information pool; and wherein the search result is related to the financial product identification information, a related market action identification, a related price, and combinations thereof.

27. The system of claim 22, wherein the messaging platform is an online service accessible over the Internet.

28. The system of claim 22, wherein the messaging platform is a downloadable software application.

29. A non-transitory processor-readable medium having instructions stored thereon, which when executed by one or more processors, cause the one or more processors to implement a method comprising:

providing a messaging platform through which a plurality of users communicate in real-time;

communicating one or more communications from or to the plurality of users, wherein at least one of the communications comprises a financial product related message entered by one of the plurality of users; and wherein the financial product related message comprises:
        a financial product identification,
        a related market action identification; and
        a related price;

analyzing the financial product related message to:
        determine, based on the related market action identification entered by the one of the plurality of users in the financial product related message, a type of the financial product related message, and
        select a tag for the financial product related message, the tag including an icon selected from icons pre-dedicated, by the one or more processors, for each of a plurality of types of financial product related messages, the icon being selected based on the type of the financial product related message;

based on the financial product related message and the tag, flagging the financial product related message, wherein the flagging includes generating, based on the financial product related message and the tag, a tagged financial product related message in a structured form associated with a searchable storage structure accessible by at least one of the plurality of users, wherein the structured form of the tagged financial product related message comprises at least the tag, a financial product identification information selected based on the financial product identification entered by the one of the plurality of users in the financial product related message, and the related price;

replacing the financial product related message with the tagged financial product related message in the at least one of the communications;

displaying the tagged financial product related message on at least one user interface associated with the at least one of the plurality of users, wherein the displaying includes displaying the icon, the financial product identification information, and the related price;

isolating the tagged financial product related message from the at least one of the communications; and storing the isolated tagged financial product related message in the searchable storage structure accessible by the at least one of the plurality of users to enable the at least one of the plurality of users to search for the tagged financial product related message based on one or more of the tag, the financial product identification information, and the related price of the structured form of the tagged financial product related message;

in response to the displaying the tagged financial product related message to the plurality of users, receiving, from one or more users of the plurality of users, a request to perform a market action indicated by the icon of the tagged financial product related message;

automatically changing the tag of the tagged financial product related message in response to an input of the one of the plurality of users to change the type of the financial product related message by:
        receiving, from the one of the plurality of users, a selection of the financial product related message;
        receiving, from the one of the plurality of users, a further related market action identification for the financial product related message, the further related market action identification indicating a further type of the financial product related message;
        based on the further related market action identification, selecting a further icon from the icons pre-dedicated for each of the plurality of types of the financial product related messages;
        generating a modified tagged financial product related message by replacing, in the tagged financial product related message, the icon with the further icon; and
        replacing the tagged financial product related message with the modified tagged financial product related message to display the modified tagged financial product related message on the at least one user interface; and in response to the displaying the modified tagged financial product related message to the plurality of users, receiving, from one or more further users of the plurality of users a request to perform a further market action indicated by the further icon of the modified tagged financial product related message.

\* \* \* \* \*